United States Patent [19]
Shepherd, Jr.

[11] 3,862,200
[45] Jan. 21, 1975

[54] ORGANOALUMINUM COMPOUNDS AND THEIR PREPARATION

[75] Inventor: Lawrence H. Shepherd, Jr., Baton Rouge, La.

[73] Assignee: Ethyl Corporation, Richmond, Va.

[22] Filed: Nov. 2, 1973

[21] Appl. No.: 412,179

[52] U.S. Cl......... 260/448 A, 260/270 K, 260/299, 260/326.8, 260/340.6, 260/340.9, 260/345.1, 260/566 R, 260/590, 260/593 R
[51] Int. Cl. ............................................. C07f 5/06
[58] Field of Search......... 260/448 R, 448 A, 340.6, 260/340.9, 270 R, 299, 326.8, 345.1

[56] References Cited
UNITED STATES PATENTS

| | | | |
|---|---|---|---|
| 3,631,065 | 12/1971 | Brendel et al. | 260/448 A |
| 3,634,482 | 1/1972 | Shepherd | 260/448 A |
| 3,641,084 | 2/1972 | Shepherd | 260/448 A |
| 3,755,400 | 8/1973 | Shepherd | 260/448 A |

OTHER PUBLICATIONS

Nesmeyanov et al., Methods of Elemento-Organic Chemistry, Vol. 1, pp. 468 & 469, 415 & 416.

Zeiss, Organometallic Chemistry, Reinhold Publ. Corp., N.Y., pp. 236–238, (1960).

Primary Examiner—H. Sneed
Attorney, Agent, or Firm—Donald L. Johnson; John F. Sieberth

[57] ABSTRACT

Organoaluminum compounds possessing a vinylic aluminaazacyclopentene moiety are described. They are prepared by reacting a nonionic organoaluminum compound possessing an aluminacyclopenetene moiety with a nitrile in the presence of a stable Lewis base. The compound possessing the vinylic aluminaazacyclopentene moiety yield on hydrolysis olefinically unsaturated ketimines or ketones depending upon the conditions used in effecting the hydrolysis. Oxidation of the moiety followed by hydrolysis yields olefinically unsaturated ketones having a hydroxyl group in the beta position relative to the keto group.

23 Claims, No Drawings

ORGANOALUMINUM COMPOUNDS AND THEIR PREPARATION

This invention relates to cyclic organoaluminum compounds and their preparation.

This invention involves, inter alia, the discovery that the aluminacycloalkene compounds of the type described in U.S. Pat. No. 3,631,065 react with nitriles to produce another class of cyclic aluminum compounds. The reaction in question involves the 1:1 molecular addition as between the aluminacyclopent-3-ene moiety and the nitrile whereby there is formed an organoaluminum compound possessing a 4-vinylic-(1-alumina-2-azacyclopent-2-ene) moiety having a carbon-bonded substituent in the 3 position. This cyclic moiety is attached by means of an aluminum-carbon bond to an organic group which in the ordinary situations will have no more than about 18 carbon atoms. For best results the reaction is performed in the presence of a stable Lewis base--i.e., a Lewis base not susceptible to excessive cleavage during the course of the reaction. Since, as pointed out more fully hereinafter, the reaction can be performed under very mild reaction conditions, a wide variety of Lewis bases including tertiary amines, ethers, and other similar substances may be used for this purpose without encountering excess cleavage. Tertiary amines, dialkyl ethers, cycloparaffinic monoethers having a six-membered ring or cycloparaffinic diethers having a five- or six-membered ring exemplify preferred Lewis bases.

Accordingly, in one embodiment this invention provides a process of preparing an organoaluminum compound possessing a 4-vinylic-(1-alumina-2-azacyclopent-2-ene) moiety which comprises reacting (i) a nonionic organoaluminum compound possessing an aluminacyclopent-3-ene moiety, the moiety being attached by means of an aluminum-carbon bond to a hydrocarbon group which optionally may be substituted by no more than one additional so-bonded aluminacyclopent-3-ene moiety, with (ii) a nitrile co-reactive therewith so that 1:1 addition occurs therebetween, the reaction being conducted in the presence of a stable Lewis base. From the cost effectiveness standpoint the preferred cyclic aluminum reactants are those in which each aluminacyclopent-3-ene moiety has the formula

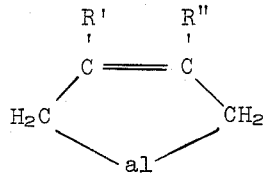

wherein R' is a hydrogen, alkyl or alkenyl group, R" is a hydrogen or alkyl group, and "al" is two-thirds of an equivalent of aluminum.

A feature of this invention is that the foregoing reaction is a facile reaction which can be readily carried out under mild reaction conditions. In fact, the reaction proceeds very smoothly and efficiently even at room temperature and thus all that is required is to bring the reactants together in the presence of the Lewis base in a suitably inert, anhydrous reaction environment. Although the reaction can, if desired, be carried out at elevated temperatures as high as about 175°C. (so long as competing reactions do not occur excessively) there is no significant advantage in doing so--reactions performed at temperatures within the range of from about 0° to 100°C. are generally found most convenient. Reactions at even lower temperatures as possible, though less convenient and generally slower.

A wide variety of nitriles can be employed in the foregoing process, including mononitriles and polynitriles. The only requirement is that the nitrile reactant be free from substituent groups which would prevent or seriously interfere with the desired 1:1 addition reaction such as hydroxyl groups, primary amino groups, carboxy groups and the like. The nitriles may be saturated or unsaturated and may contain substituents which are relatively inert to the aluminacyclopent-3-ene moiety at the reaction temperatures being used (room temperature, for example) such as halogen atoms in non-activated positions, tertiary amino groups (i.e., amino groups not containing nitrogen-hydrogen bonds), ether linkages, thioether linkages, $R_3Si$— groups, $R_2P$— groups, RSe— groups, XMgO— groups (X = halogen), $R_3SiO$— groups, and the like. In short, use may be made of any organic nitrile capable of reacting with the aluminacyclopent-3-ene moiety via a 1:1 addition reaction at a reaction temperature somewhere between about 0 and 100°C. to form a 4-vinylic-(1-alumina-2-azacyclopent-2-ene) moiety having a substituent in the 3 position corresponding to that to which a cyano group was attached in the nitrile reactant. Thus, functional substituents may be present in the nitrile reactant as long as they are innocuous in the sense they do not prevent the formation of the 4-vinylic-(1-alumina-2-azacyclopent-2-ene) moiety nor interfere with the existence of this moiety once it has been formed. For example, nitriles having functional groups containing labile hydrogen atoms (e.g., hydroxyl, primary and secondary amino, hydrazino, isonitroso, sulfamino, mercapto, imino, etc.) or functional groups containing reactive double bonds between dissimilar atoms (e.g., carbonyl, nitro, nitroso, sulfinyl, sulfonyl, thiocarbonyl, etc.) are ordinarily not recommended for use in the process. The suitability of any given nitrile for use in the process can readily be determined by the simple expedient of performing a few pilot experiments using, for instance, the procedure set forth in the Example given hereinafter.

A few exemplary nitriles for use in the process include acetonitrile, propionitrile, butyronitrile, isobutyronitrile, valeronitrile, alpha-methylbutyronitrile, isocapronitrile, alphaethyl-butyronitrile, caprylonitrile, succinonitrile, glutaronitrile, acrylonitrile, methacrylonitrile, allyl cyanide, 4-pentenenitrile benzylcyanide, benzonitrile, o-tolunitrile, m-tolunitrile, p-tolunitrile, 2-bromobenzonitrile, 3-bromobenzonitrile, 4-bromobenzonitrile, isophthalonitrile, 1-adamantanecarbonitrile, cinnamonitrile, 3,7-dimethyl-2,6-octadienenitrile, alpha-ethyl-1-cycloheptene-1-acetonitrile, nonadecanenitrile, anisonitrile, 9-anthracenecarbonitrile, anthranilonitrile, 1-naphthylacetonitrile, 2-naphthylacetonitrile, 5-dimethylaminoanthranilonitrile, benzylidenemalononitrile, chloroacetonitrile, 2-chloroacrylonitrile, 2-chlorobenzonitrile, 3-chlorobenzonitrile, 4-chlorobenzonitrile, 3-chlorobenzyl cyanide, 4-chlorobenzyl cyanide, p-fluoro-alphamethylphenylacetonitrile, malononitrile, mandelonitrile, methoxyacetonitrile, 2-methoxy-1-naphthonitrile, 4-methoxy-1-naphthonitrile, (p-methoxyphenyl)-acetonitrile, 1-(p-methoxyphenyl)-1-cyclohexanecarbonitrile, 1-(p-methoxyphenyl)-1- cyclopentanecarbonitrile, 1-(p-methoxyphenyl)-1-cyclopropanecarbonitrile, 3-methoxypropionitrile, 4-biphenylcarbonitrile, 4-biphenylacetonitrile, trimethylacetonitrile, 2,4,6-trimethylbenzonitrile, triphenylacrylonitrile, 1,2,3-tris-(2-cyanoethoxy)-propane, tris(2-cyanoethyl)-phosphine, undecanenitrile, n-undecyl cyanide, hexanenitrile, pentadecanenitrile, 7,7,8,8-tetracyanoquinodimethane, dichloromalononitrile, 2,6-dichlorophenylacetonitrile, 1,2-dicyanobenzene, 1,3-dicyanobenzene, 1,4-dicyanobenzene, 1,4-dicyanobutane, 1,4-dicyano-2butene, 1,2-dicyanocyclobutane, 1,5-dicyanopentane, dicyanohexane, diethylaminoacetontrile, alpha-cyano-o-tolunitrile, 2-norbornanecarbonitrile, tetracyanoethylene, tetrachlorophthalonitrile, 4-bromobutyronitrile, 4-bromo-2,2-diphenylbutyronitrile, p-bromophenylacetonitrile, 3-bromopropionitrile, alpha-bromo-o-tolunitrile, alpha-bromo-n-tolunitrile, alpha-bromo-p-tolunitrile, 5-bromovaleronitrile, m-flurophenylacetonitrile, p-fluorophenylacetonitrile, fumaronitrile, 2-furanacetonitrile, 2-furanacrylonitrile, 2-furonitrile, tetradecanedinitrile, tetrafluoroterephthalonitrile, 2,3,-5,6-tetramethyl-p-benzenediacetonitrile, phenyl-2-pyridylacetonitrile, 3-pyridylacetonitrile, n-heptyl cyanide, 2-chloro-6-methylbenzonitrile, 3-chloro-4-methylbenzonitrile, p-chloro-alpha-methylphenylacetonitrile, 3-chloro-2-methylpropionitrile, 1-cyanonaphthalene, 9-cyanophenanthrene, 2,3,4-trimethoxybenzonitrile, 2,4,6-trimethoxybenzonitrile, 3,4,5-trimethoxybenzonitrile, 3,4,5-trimethyoxyphenylacetonitrile, iodoacetonitrile, alphamethylbenzyl cyanide, 2-methylbenzyl cyanide, 3-methylbenzyl cyanide, 4-methylbenzyl cyanide, 1-(p-chlorophenyl)-1-cyclobutanecarbonitrile, 1-(p-chlorophenyl)-1-cyclohexanecarbonitrile, 1-(p-chlorophenyl)-1-cyclopentanecarbonitrile, 1-(p-chlorophenyl)-1-cyclopropanecarbonitrile, 3-chloropropionitrile, 5-chlorovaleronitrile, 5-norbornene-2-carbonitrile, n-octyl cyanide, betaphenylcinnamonitrile, 1-phenylcyclobutanecarbonitrile, 1-phenyl-1-cyclopropanecarbonitrile, trichloroacetonitrile, dibromoacetonitrile, 2,6-dichlorobenzonitrile, 3,5-dichlorobenzonitrile, 2-cyanoethyl ether, 1-(p-tolyl)-1-cyclohexanecarbonitrile, 1-(p-tolyl)-1-cyclopentanecarbonitrile, 1-(p-tolyl)-1-cyclopropanecarbonitrile, dodecanedinitrile, (1-ethoxyethylidene)malononitrile, ethoxymethylenemalononitrile, 3-cyclohexene-1-carbonitrile, 1-cyclohexenylacetonitrile, tridecanenitrile, diphenylacetonitrile, 2,2-diphenylpropionitrile, trans-1-cyano-2-phenylcyclopropane, cyclohexylphenylacetonitrile, 1-cyclopenteneacetonitrile, cyclopropyl cyanide, 2-thiopheneacetonitrile, 2-thiopheneacrylonitrile, 2-thiophenecarbonitrile, 2,3-dimethoxybenzonitrile, 2,4-dimethoxybenzonitrile, 3,4-dimethoxybenzonitrile, 3,5-dimethoxybenzonitrile, 3,4dimethoxycinnamonitrile, (3,4-dimethoxyphenyl)-acetonitrile, 2-cyanopyridine, 3-cyanopyridine, and 4-cyanopyridine. Hydrocarbyl mononitriles (e.g., nitriles containing up to about 24 carbon atoms in the molecule) serve as one typical group of preferred nitrile reactants for use in the process of this invention.

As noted above the cyclic organoaluminum compounds provided by this invention possess a 4-vinylic-(1-alumina-2-azacyclopent-2-ene) moiety, the moiety being attached by means of an aluminum-carbon bond to an organic group which normally will contain up to about 18 carbon atoms. In addition to the vinylic substituent in the 4 position, the moiety will contain a substituent in the 3 position corresponding to the organic group to which the cyano group was attached in the nitrile reactant. For example when the nitrile reactant is acetonitrile cyanocyclopropane, glutaronitrile, benzyl cyanide, and p-bromobenzonitrile the substituent in the 3 position of the resultant 4-vinylic(1-alumina-2-azacyclopent-2-ene) moiety formed in the respective 1:1 addition reactions is methyl, cyclopropyl, 3-cyanopropyl, benzyl and p-bromphenyl, respectively. Thus, this invention provides an organoaluminum compound possessing a 4-vinylic(1-alumina-2-azacyclopent-2-ene) moiety having an innocuous carbon bonded substituent in the 3 position, innocuous in the sense that it did not prevent the formation of the moiety nor interfere with the existence of the moiety once it was formed. A few exemplary moieties of this type include those in which the substituent in the 3 position is a hydrocarbyl substituent having up to about 18 carbon atoms, the vinylic substituent in the 4 position being the vinyl group, the isopropenyl group, the 1ethylvinyl group, or the 1-(4-methyl-pent-3-enyl)vinyl group. The 4 position in the moiety can contain another substituent in addition to the vinylic substituent. One group of such compounds is those in which the 3 position carries a hydrocarbyl substituent having up to about 18 carbon atoms and the 4 position contains an isopropenyl group and amethyl group.

The organic group bonded by means of an aluminum-carbon bond to the aluminum atom in the 4-vinylic-(1-alumina-2-azacyclopent-2-ene) moiety will generally correspond to the hydrocarbon group present in the initial aluminacyclopent-3-ene reactant and accordingly for further details reference may be had to U.S. Pat. Nos. 3,631,065; 3,634,482; and 3,755,400, each of which deals, inter alia, with the synthesis of organic compounds containing the aluminacyclopent-3-ene moiety. All such compounds are suitable for use in the practice of this invention and in the usual case the identity of the organic group satisfying the remaining valence bond of the aluminum atom in the aluminacyclopent-3-ene moiety is of no practical significance. Normally this organic group which satisfies the third valence bond of the aluminum atom may be regarded as "excess baggage" which does not affect the outcome of the desired addition reaction.

One preferred group of cyclic aluminum reactants for use in the process of this invention has the formula

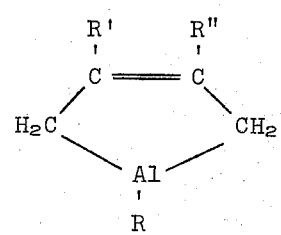

wherein R is a hydrocarbon group having up to about 18 carbon atoms, R' is hydrogen or an alkyl or an alkenyl group, and R" is hydrogen or an alkyl group. Although R' and R" may contain any suitable number of carbon atoms (e.g., 12 or more) in most cases they will contain up to about 6 carbon atoms each — i.e., they are preferably lower alkyl or lower alkenyl groups or hydrogen.

Preferred organoaluminum compounds provided by this invention are those having the formula

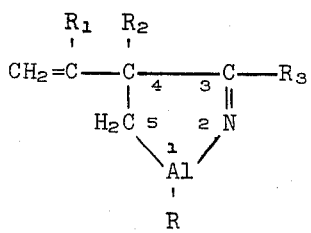

wherein R is a hydrocarbon group having up to about 18 carbon atoms (most preferably a lower alkyl group), and in the simplest cases $R_1$ is hydrogen or an alkyl or alkenyl group, $R_2$ is hydrogen or an alkyl group, and $R_3$ is an innocuous carbon-bonded organic group having up to about 30 carbon atoms, such as a hydrocarbyl group having up to about 30 carbon atoms. Preferably, $R_3$ has up to about 18 carbon atoms. Since it is convenient to utilize diisobutylaluminum hydride or sodium aluminum tetraethyl in the synthesis of the aluminocylopent-3-ene moiety containing compounds used to form the organoaluminum compounds depicted in the above formula (see U.S. Pat. Nos. 3,631,065 and 3,634,482, respectively) R in the above formula will frequently be isobutyl or ethyl.

There is a marked tendency for the cyclic aluminum compounds of this invention to form complexes with Lewis bases such as amines, ethers, thioethers, and the like. These complexes, especially when the Lewis base is a tertiary amine, dialkyl ether, cycloparaffinic monoether having a six-membered ring or cycloparaffinic diether having a five- or six-membered ring, constitute preferred embodiments of this invention.

The cyclic aluminum compounds of this invention are non-ionic. They are usually soluble in conventional aliphatic and aromatic hydrocarbon solvents such as benzene.

Another feature of this invention is the fact that the organoaluminum compounds provided by this invention are of particular utility as intermediates in the synthesis of various poly-functional products. For example, on hydrolysis the compounds of this invention yield olefinically unsaturated ketimines or ketones depending upon the conditions used in effecting the hydrolysis. Thus, if mild hydrolysis conditions are used (e.g., hydrolysis with water or dilute acid at 0° to 5°C.) the product is generally a ketimine. On the other hand, when the hydrolysis is carried out under more stringent reaction conditions (e.g., hydrolysis at temperatures in the range of 50° to 100°C.) an olefinically unsaturated ketone is formed. Alternatively, the cyclic organoaluminum compounds of this invention may be subjected to low temperature oxidation with air or oxygen to yield a cyclic alkoxide intermediate which, on hydrolysis, yield, olefinically unsaturated ketones having a hydroxyl group in the beta position relative to the keto group. The oxidation of the substituted 1-alumina-2-azacyclopent-2ene moiety to form the corresponding cyclic alkoxide moiety (1-alumina-2-aza-6-oxacyclohex-2-ene) utilizes reaction conditions such as described in U.S. Pat. No. 3,642,825.

In order to further appreciate the practice and advantages of this invention there are presented below in tabular form some typical products which may be produced by some of the reactions described above.

The transformations set forth in the tabulation give some indication of the variety of products which can now be readily produced by virtue of this invention. It will be appreciated of course that it is possible to isomerize the double bond in the olefinically unsaturated ketimines and ketones produced upon hydrolysis (columns 4 and 5 of the above tabulation). Thus, if ketimines or ketones having a doulbe bond in a different position are desired, suitable isomerization procedures are available for effecting this transformation.

The following example specifically illustrates a typical synthesis of a representative compound of this invention and its use as an intermediate in the formation of ketimine and ketone products. This example is pres-

TABLE

| (1) Aluminum-Containing Cyclic Moiety in Reactant | (2) Nitrile Reactant | (3) Aluminum-Containing Cyclic Moiety Formed on 1:1 Addition Reaction between (1) and (2) | (4) Ketimine formed on Hydrolysis of (3) | (5) Ketone formed on Hydrolysis of (4) |
|---|---|---|---|---|
| aluminacyclopent-3-ene | butyronitrile | 4-vinyl-3-propyl-(1-alumina-2-azacyclopent-2-ene) | 4-imino-5-methyl-hept-6-ene | 5-methyl-hept-6-en-4-one |
| 3-methyl-aluminacyclo-pent-3-ene | 1-cyclohexenyl-acetonitrile | 4-isopropenyl-3-(1-cyclo-hexenyl carbinyl)-(1-alumina-2-azacyclopent-2-ene) | 2-imino-1-(cyclo-hexenyl)-3,4-dimethyl-pent-4-ene | 1-(1-cyclohexenyl)-3,4-dimethyl-pent-4-en-2-one |
| 3-ethyl-aluminacyclo-pent-3-ene | cycloheptyl cyanide | 4-(1-ethylvinyl)-3-cyclo-heptyl-(1-alumina-2-azacyclopent-2-ene) | 1-imino-1-cyclo-heptyl-2-methyl-3-ethyl-but-3-ene | 1-cycloheptyl-2-methyl-3-ethyl-but-3-en-1-one |
| 2,3-dimethyl-1-alumina-cyclopent-3-ene | 1,6-dicyanohexane | 4-isopropenyl-4-methyl-3-(6-cyanohexyl)-(1-alumina-2-azacyclopent-2-ene) | 7-imino-1-cyano-8,8,9-trimethyl-dec-9-ene | 1-cyano-8,8,9-trimethyl-dec-9-en-7-one |
| 3-(4-methyl-pent-3-enyl)-aluminacyclopent-3-ene | methoxyaceto-nitrile | 4-[1-(4-methyl-pent-3-enyl)-vinyl]-3-methoxycarbinyl-(1-alumina-2-azacyclopent-2-ene) | 2-imino-1-methoxy-3-methyl-4-(4-methylpent-3-enyl)-pent-4-ene | 1-methoxy-3-methyl-4-(4-methylpent-3-enyl)-pent-4-en-2-one |
| aluminacyclopent-3-ene | alpha-methylbenzyl cyanide | 4-vinyl-3-(1-phenethyl)-(1-alumina-2-azacyclopent-2-ene) | 3-imino-2-phenyl-4-methyl-hex-5-ene | 2-phenyl-4-methyl-hex-5-en-3-one |
| 3-methyl-aluminacyclo-pent-3-ene | p-fluorobenzo-nitrile | 4-isopropenyl-3-p-fluoro-pheny-(1-alumina-2-aza-cyclopent-2-ene) | 1-imino-1-(p-fluorophenyl)-2,3-dimethyl-but-3-ene | 1-(p-fluorophenyl)-2,3-dimethyl-but-3-en-1-one |
| aluminacyclopent-3-ene | 3,5-dimethoxy-benzonitrile | 4-vinyl-3-(3,5-dimethoxy-phenyl)-)1-alumina-2-azacyclopent-2-ene) | 1-imino-1-(3,5-dimethoxyphenyl)-2-methyl-but-3-ene | 1-(3,5-dimethoxy-phenyl)-2-methyl-but-3-en-1-one |
| aluminacyclopent-3-ene | p-tolunitrile | 4-vinyl-3-p-tolyl-(1-alumina-2-azacyclopent-2-ene) | 1-imino-1-p-tolyl-2-methyl-but-3-ene | 1-p-tolyl-2-methyl-but-3-en-1-one |
| 3-methyl-aluminacyclopent-3-ene | stearonitrile | 4-isopropenyl-3-heptadecyl-(1-alumina-2-azacyclopent-2-ene) | 18-imino-19,20-dimethyl-henicos-20-ene | 19,20-dimethylhenicos-20-en-18-one |

EXAMPLE

Reaction of 1-isobutyl-3-methyl-aluminacyclopent-3-ene with benzonitrile followed by two-stage hydrolysis To 30 ml of a 1,4-dioxane solution containing 25 mmoles of 1-isobutyl-3-methyl-aluminacyclopent-3-ene (see U.S. Pat. No. 3,631,065) was slowly added 3.0 milliliters (approximately 29 mmoles) of freshly distilled benzonitrile. During the addition the temperature of the stirred reaction mixture increased from room temperature (ca. 25°C.) to 50°C. and the system turned reddish brown in color. The reaction mixture was allowed to stand at room temperature overnight. Thereupon most of the dioxane was stripped off and the residue redissolved in diethyl ether. The organoaluminum product was then hydrolyzed by cooling the diethyl ether solution to about 0°C. and adding cold water thereto followed by addition of cold dilute HCl. The ether solution was separated from the aqueous phase and found to contain some ketone product. The separated aqueous phase was extracted with fresh diethyl ether from which only a trace of ether-soluble product was isolated. A substantial portion of the ketimine remained in solution in the aqueous HCl and accordingly this solution was heated on a steam bath for 30 minutes whereby, on hydrolysis of the ketimine, an oil was formed which was extracted from the aqueous layer by means of diethyl ether. After washing the ether extract with aqueous sodium bicarbonate solution, the ether solution was dried over magnesium sulfate. Thereupon the diethyl ether was stripped off and the residue was vacuum distilled whereby 2.9 grams (16.5 mmoles) of ketone product was obtained at 100°C. and 7 millimeters of mercury pressure. This amounted to a 66 percent yield of isolated product. The structure of the ketone was established by means of nuclear magnetic resonance and infrared spectra and the product was found to be 1-phenyl-2,3-dimethyl-but-3-en-1-one. Accordingly, the water-soluble ketimine intermediate was 1-imino-1-phenyl-2,3-dimethylbut-3-ene.

It will be seen therefore that the cyclic organoaluminum product formed in the above addition reaction was 4-isopropenyl-1-isobutyl-3-phenyl-(1-alumina-2-azacyclopent-2-ene):

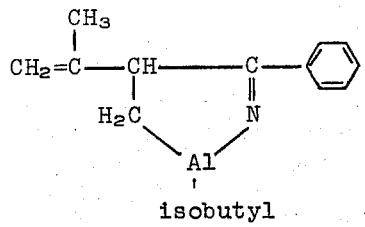

It was produced in a yield of over 66 percent. As noted above, the process of this invention is normally conducted in the presence of a Lewis base having suitable chemical stability under the reaction conditions being utilized. In most cases the Lewis base will be employed as the principal reaction solvent—i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes and the like) provided a suitable amount of the Lewis base is also present in the reaction system. Ordinarily the system should contain at least one or two mols of Lewis base per mol of aluminum reactant employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclidine, and the like); dialkyl ethers (e.g., dimethyl ether, diethyl ether, diisopropyl ether, methylisoamyl ether, dibutyl ether, dihexyl ether and the like); cycloparaffinic monoethers having a six-membered ring (e.g., tetrahydropyran--pentamethylene oxide--and ring alkylated derivatives thereof); and cycloparaffinic diethers having a five- or six-membered ring (e.g., 1,4-dioxane, 1,3-dioxolane, 2-methyl2-ethyl-1,3-dioxolane; and the like); and other similar substances which tend not to be excessively cleaved in the reaction, such as dicyclohexyl ether, dibenzyl ether, and the like. At the lower reaction temperatures, glycol ethers are also suitable solvents.

The relative proportions of the reactants and reaction diluents do not appear to be critical as lond as there is present a sufficient amount of each reactant to participate in the desired reaction.

Ordinarily the reaction will be conducted at atmospheric pressure or at the ambient pressures encountered when conducting the reaction in a close reaction vessel. However, when using some of the lower boiling Lewis base solvents, e.g., dimethyl ether, trimethyl amine or the like, it is desirable to conduct the reaction at a high enough pressure to keep the system in the liquid state of aggregation. Thus, pressures up to about 50 atmospheres may be employed.

It will of course be understood that in the addition reaction the reaction mixture should be kept essentially anhydrous and that exposure of the reaction system to air should be kept at a minimum. Naturally one should select a reaction temperature at which the reaction proceeds at a satisfactory rate without encountering excessive adverse side reactions such as thermal decomposition, undesired cleavage reactions, undesired competitive reactions or the like.

The period of time during which the reactants interact with each other is susceptible to considerable variation and is generally discretionary. In general, the higher the reaction temperature, the shorter the reaction or contact time.

Exemplary of the compounds of this invention which may be produced in the manner described above are the following:

4-vinyl-1-ethyl-3-octyl-(1-alumina-2-azacyclopent-2-ene)

4-isopropenyl-1-propyl-3-benzyl-(1-alumina-2-azacyclopent-2-ene)

4-isopropenyl-1-butyl-3,4-dimethyl-(1-alumina-2-azacyclopent-2-ene)

4-(1-ethylvinyl)-1-isobutyl-3-p-chlorophenyl-(1-alumina-2-azacyclopent-2-ene)

4-vinyl-1-octadecyl-3-trichloromethyl-(1-alumina-2-azacyclopent-2-ene)

Other products of this invention and their synthesis and use will be clearly apparent to those skilled in the art

I claim:

1. An organoaluminum compound possessing a 4-vinylic(1-alumina-2-azacyclopent-2-ene) moiety having a carbon-bonded substituent in the 3 position, the moiety being attached by means of an aluminum-carbon bond to a hydrocarbon group having up to about 18 carbon atoms.

2. A compound according to claim 1 wherein the vinylic substituent in the 4 position of said moiety is the vinyl group and the substituent in the 3 position of said moiety is a hydrocarbyl substituent having up to about 18 carbon atoms.

3. A compound according to claim 1 wherein the vinylic substituent in the 4 position of said moiety is the isopropenyl group and the substituent in the 3 position of said moiety is a hydrocarbyl substituent having up to about 18 carbon atoms.

4. A compound according to claim 1 wherein the vinylic substituent in the 4 position of said moiety is the 1-ethylvinyl group and the substituent in the 3 position of said moiety is a hydrocarbyl substituent having up to about 18 carbon atoms.

5. A compound according to claim 1 wherein the vinylic substituent in the 4 position of said moiety is the isopropenyl group, the 4 position of said moiety also carries a methyl group, and the substituent in the 3 position of said moiety is a hydrocarbyl substituent having up to about 18 carbon atoms.

6. A compound according to claim 1 wherein the vinylic substituent in the 4 position of said moiety is the 1-(4-methylpent-3-enyl)vinyl group and the substituent in the 3 position of said moiety is a hydrocarbyl substituent having up to about 18 carbon atoms.

7. A compound according to claim 1 complexed with a Lewis base.

8. A compound according to claim 1 complexed with an ether or a tertiary amine.

9. An organoaluminum compound of the formula

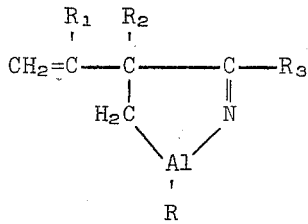

wherein R is a hydrocarbon group having up to about 18 carbon atoms, $R_1$ is hydrogen or an alkyl or an alkenyl group, $R_2$ is hydrogen or an alkyl group, and $R_3$ is a carbon-bonded group having up to about 30 carbon atoms.

10. A compound according to claim 9 wherein R is a lower alkyl group.

11. A compound according to claim 9 wherein $R_3$ contains up to about 18 carbon atoms.

12. A compound according to claim 9 wherein R is a lower alkyl group and $R_3$ is an alkyl, cycloalkyl, aralkyl or aryl group.

13. A compound according to claim 9 complexed with a Lewis base.

14. A compound according to claim 9 complexed with a tertiary amine, a dialkyl ether, a cycloparaffinic monoether having a six-membered ring or a cycloparaffinic diether having a five- or six-membered ring.

15. A compound according to claim 9 complexed with 1,4-dioxane.

16. A composition according to claim 9 wherein the compound is 4-isopropenyl-1-isobutyl-3-phenyl-(1-alumina-2-azacyclopent-2-ene).

17. A process of preparing an organoaluminum compound possessing a 4-vinylic-(1-alumina-2-azacyclopent-2-ene) moiety which comprises reacting (i) a nonionic organoaluminum compound possessing an aluminacyclopent-3-ene moiety, the moiety being attached by means of an aluminum-carbon bond to a hydrocarbon group which optionally may be substituted with no more than one additional so-bonded aluminacyclopent-3-ene moiety with (ii) a nitrile coreactive with said moiety so that a 1:1 addition occurs therebetween, the reaction being conducted in the presence of a stable Lewis base.

18. The process of claim 17 wherein the Lewis base is an ether or a tertiary amine.

19. The process of claim 17 wherein the Lewis base is a tertiary amine, a dialkyl ether, a cycloparaffinic monoether having a six-membered ring, or a cycloparaffinic diether having a five- or six-membered ring.

20. The process of claim 17 wherein the aluminacyclopent-3-ene moiety has the formula

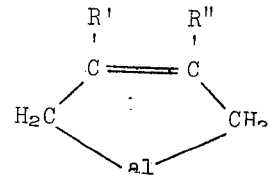

wherein R' is a hydrogen, alkyl or alkenyl group, R'' is a hydrogen or alkyl group, and "al" is two-thirds of an equivalent of aluminium.

21. A process of preparing an organoaluminum compound possessing a 4-vinylic-(1-alumina-2-azacyclopent-2-ene) moiety which comprises reacting in an ether reaction medium a hydrocarbyl mononitrile and an organoaluminum compound of the formula

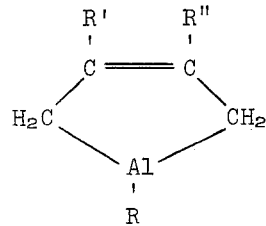

wherein R is a hydrocarbon group having up to about 18 carbon atoms, R' is a hydrogen, lower alkyl or lower alkenyl group, and R'' is a hydrogen or lower alkyl group.

22. The process of claim 21 wherein R is a lower alkyl group.

23. The process of claim 21 wherein R is a lower alkyl group and the ether reaction medium is at least one dialkyl ether or cycloparaffinic monoether having a six-membered ring or cycloparaffinic diether having a five- or six-membered ring.

* * * * *